United States Patent
Vivanco et al.

(10) Patent No.: US 8,929,234 B1
(45) Date of Patent: Jan. 6, 2015

(54) INTERMEDIATE NETWORK BANDWIDTH REQUIREMENT DETERMINATION

(75) Inventors: Daniel Vivanco, Reston, VA (US); Kyounghwan Lee, Herndon, VA (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 348 days.

(21) Appl. No.: 13/296,877

(22) Filed: Nov. 15, 2011

(51) Int. Cl.
*G08C 15/00* (2006.01)

(52) U.S. Cl.
USPC .......................... 370/252; 370/254; 370/401

(58) Field of Classification Search
None
See application file for complete search history.

(56) References Cited

U.S. PATENT DOCUMENTS

| | | | |
|---|---|---|---|
| 7,450,948 B2 | 11/2008 | Argyropoulos et al. | |
| 7,570,953 B2 * | 8/2009 | Maltsev et al. | 455/450 |
| 7,792,534 B2 * | 9/2010 | Wu et al. | 455/452.2 |
| 2004/0125768 A1 * | 7/2004 | Yoon et al. | 370/331 |
| 2006/0013182 A1 * | 1/2006 | Balasubramanian et al. | 370/343 |
| 2009/0257387 A1 * | 10/2009 | Gholmieh et al. | 370/329 |
| 2009/0310501 A1 | 12/2009 | Catovic et al. | |
| 2010/0123575 A1 | 5/2010 | Mittal et al. | |
| 2011/0026495 A1 * | 2/2011 | Lee et al. | 370/335 |
| 2011/0044239 A1 * | 2/2011 | Cai et al. | 370/328 |
| 2011/0141999 A1 * | 6/2011 | Karlsson et al. | 370/329 |

* cited by examiner

*Primary Examiner* — Gregory Sefcheck
*Assistant Examiner* — Daniel Mitchell

(57) ABSTRACT

In a system and method of determining bandwidth requirements of an intermediate network between a first network and a second network, determining data throughput characteristics of each of a plurality of carriers in communication with the intermediate network, determining a load balancing efficiency metric based on the determined carrier data throughput characteristics, estimating a multiplexing factor based on the load balancing efficiency metric and a total number of the plurality of carriers, and determining an actual bandwidth requirement of the intermediate network based on the multiplexing factor and a theoretical maximum bandwidth of the intermediate network.

17 Claims, 5 Drawing Sheets

INTERMEDIATE NETWORK BANDWIDTH REQUIREMENT DETERMINATION

TECHNICAL BACKGROUND

Construction, deployment and operation of a large-scale communications system is a massive endeavor. Communication system capacity planning is required to efficiently accommodate communication system usage trends with consideration, among other things, of the potential discrepancy between peak and average data rates. In the case of a wireless communication network, for example, the potential discrepancy between peak and average data rates can by affected by various factors, such as the number of wireless devices connecting to an access node, a number of sectors in an access node service area, and the demand for services in the communication system.

Data traffic in a communications system is typically passed through intermediate networks in the communication system. An intermediate network of a communications system comprises intermediate links between and among devices, network elements, and/or networks or sub-networks of the communication system. Examples of an intermediate network include a network backhaul, intermediate links between a core network and subnetworks at the edge of a network, and an intermediate network or links between two subnetworks of a communication system, to name but two. In addition, in multi-technology networks, intermediate networks are also capable of handling data traffic from multiple carriers and/or technologies. Thus, intermediate network capacity planning is a vital aspect of the construction, deployment and operation of a communication system.

OVERVIEW

In systems and methods of determining bandwidth requirements of an intermediate network between a first network and a second network, data throughput characteristics of each of a plurality of carriers supported by the intermediate network are determined. Based on the determined carrier data throughput characteristics, a load balancing efficiency metric is determined, and a multiplexing factor is estimated based on the load balancing efficiency metric and a total number of the plurality of carriers. Based on the multiplexing factor and a theoretical maximum bandwidth of the intermediate network, an actual bandwidth requirement of the intermediate network is determined.

DETAILED DESCRIPTION

In operation, data throughput characteristics of each of a plurality of carriers in communication with an intermediate network are determined, and based on the determined carrier data throughput characteristics a load balancing efficiency metric is determined. A multiplexing factor is estimated based on the load balancing efficiency metric and a total number of the plurality of carriers. Based on the multiplexing factor and a theoretical maximum bandwidth of the intermediate network, an actual bandwidth requirement of the intermediate network is determined.

Figure 1A:
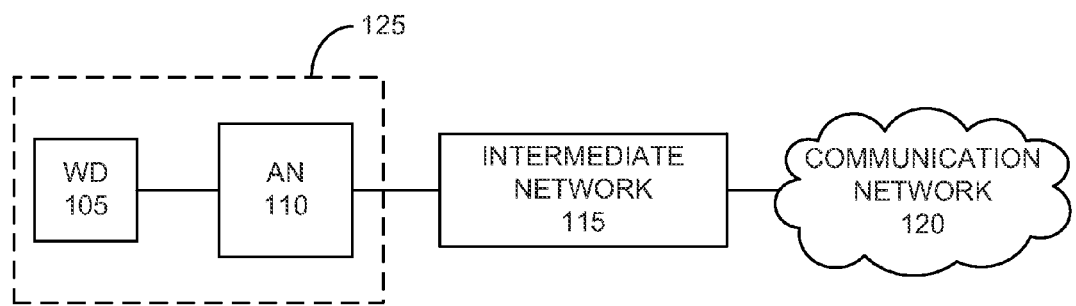
FIGS. 1A and 1B illustrate exemplary intermediate networks in exemplary communication systems.

FIG. 1A illustrates an exemplary communication system 100A comprising an access network 125, an intermediate communication network 115, and a communication network 120. Other network elements may be present in the communication system 100A to facilitate wireless communication but are omitted for clarity, such as gateways, routers, mobile switching centers, and location registers such as a home location register or visitor location register. Access network 125 comprises wireless device 105 and access node 110. Examples of a wireless device 105 include a cell phone, a smart phone, a computing platform such as a laptop, palmtop, or tablet, a personal digital assistant, an internet access device, or other device capable of wireless communication, including combinations thereof. Access node 110 communicates with the wireless device 105, and can be for example a base transceiver station and an eNodeB device. Communication network 120 is a network or internetwork and is in communication with the access node 110 through the intermediate network 115. Communication network 120 can be, for example, a subnetwork of a communication system, such as at the edge of a communication system, or it can be a core network of a communication system, or it can be another intermediate network of a communication system, or combinations thereof.

Intermediate network 115 communicates with the access network 125 and with communication network 120. An intermediate network can be, for example, intermediate links between a core network and subnetworks at the edge of a network. In another example, an intermediate network can be a link or connection from a base station to a central network, such as a core network of communication system 100A. Another example of an intermediate network is a link between customer premises equipment and multiplexing equipment. Another example of an intermediate network is a link between an access node and an element of an edge network or a core network of a communication system.

The access network 125, the intermediate network 115, and the communication network 120, each communicate over wired or wireless communication links or combinations thereof. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Figure 1B:
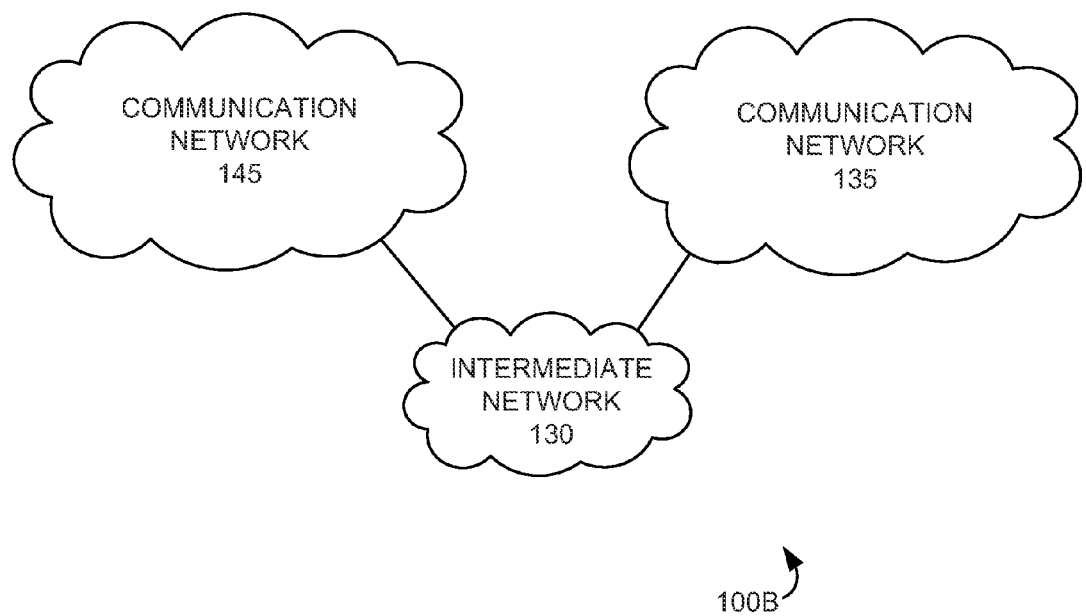

FIG. 1B illustrates an exemplary communication system 100B comprising communication network 145, intermediate network 130, and communication network 135. Communication networks 135 and 145 are networks or internetworks and are in communication with the intermediate network 115. For example, communication networks 135 and 145 can be subnetworks and/or a core network of a larger communication system, which intercommunicate through the intermediate network 130. Intermediate network 130 can thus be, for example, intermediate links between subnetworks of communication system 100B, or between a core network and a subnetwork. The communications networks 135 and 145, and the intermediate network 130 each communicate over wired or wireless communication links or combinations thereof. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Figure 2:
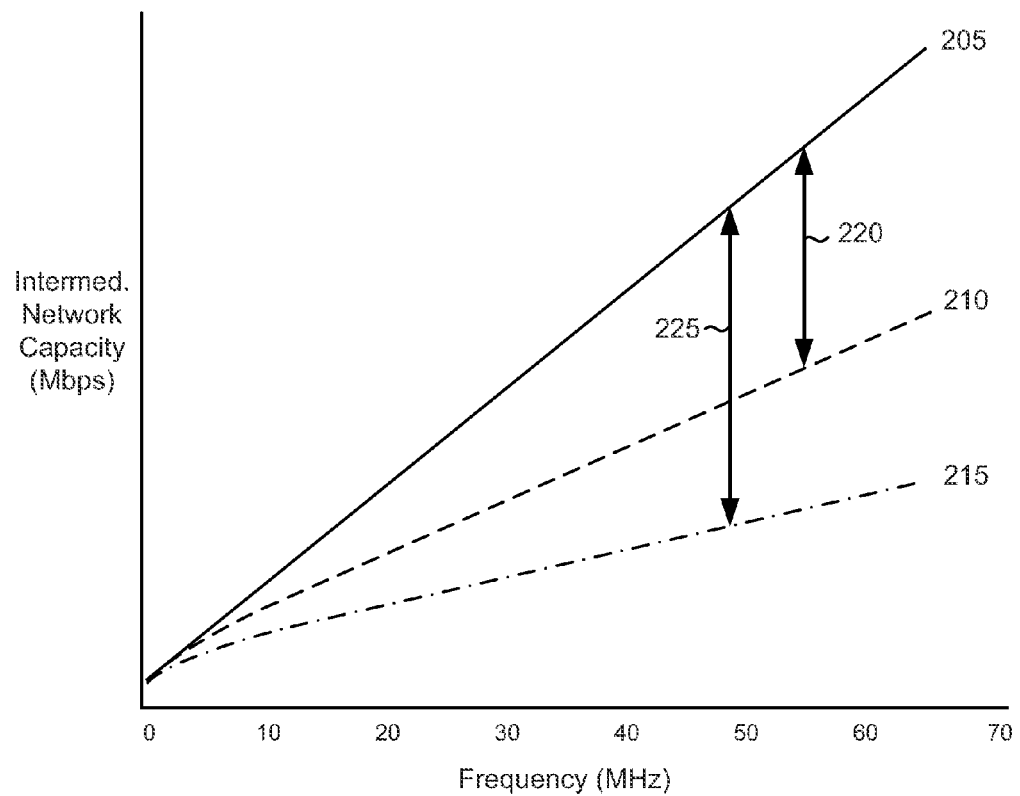
FIG. 2 illustrates exemplary theoretical maximum and actual intermediate network capacities.

FIG. 2 illustrates exemplary theoretical maximum network capacity 205 and actual intermediate network capacities 210 and 215. Theoretical maximum 205 illustrates a theoretical maximum intermediate network capacity which increases with respect to the number of carriers supported by an intermediate network. Theoretical maximum 205 can also be expressed as follows:

$$C_{TM}(n) = \sum_{i=1}^{n} C_M(i),$$

where the $C_M$ is the maximum capacity of carrier i and $C_{TM}(n)$ is the theoretical maximum capacity of the intermediate network with n carriers. Theoretical maximum 205 has a substantially linear relationship to the number of carriers supported by an intermediate network, and is typically used in traditional methods of capacity planning for intermediate networks, where capacity is deployed in consideration of a theoretical maximum peak demand. However, this relationship does not accurately depict a realistic demand on capacity in an intermediate network, in part because the probability that demand on all carriers in an intermediate network will peak simultaneously decreases as the number of carriers in the intermediate network increases. Thus, an actual intermediate network capacity $C_A$ which is less than the theoretical maximum network capacity $C_{TM}$ can be determined, which can allow efficient deployment of network resources in an intermediate network. To determine the intermediate network capacity $C_A$, a multiplexing factor MF can be considered for the number of carriers n in an intermediate network, together with the theoretical maximum capacity $C_{TM}$ of the n carriers:

$C_{TM}(n)*MF(n)=C_A(n), MF(n)\epsilon[0,1].$

MF(n) is a function of n carriers and the efficiency of a load balancing scheme employed for the n carriers. Load balancing can include inter-frequency, intra-frequency, and inter-technology load balancing. An example of inter-frequency load balancing is balancing data traffic among carriers of different frequency bands. An example of intra-frequency load balancing is balancing data traffic among different carriers using substantially the same frequency band. An example of inter-technology load balancing in an intermediate network is distributing data traffic among third generation (3G) and fourth generation (4G) protocols in the intermediate network.

FIG. 2 illustrates that first $C_A$ 210 and second $C_A$ 215 are more efficient than $C_{TM}$ with respect to the number of carriers deployed in consideration of the total demand on the intermediate network. First MF(n) 220 and second MF(n) 225 reflect the efficiency of the load balancing scheme employed in the intermediate network, such that as inefficiency increases, the proposed intermediate network capacity $C_A$ approaches the theoretical maximum network capacity $C_{TM}$. Thus, MF(n) 225 represents a smaller required intermediate network capacity than MF(n) 220, where both first $C_A$ 210 and second $C_A$ 215 are more efficient than $C_{TM}$.

Figure 3A:
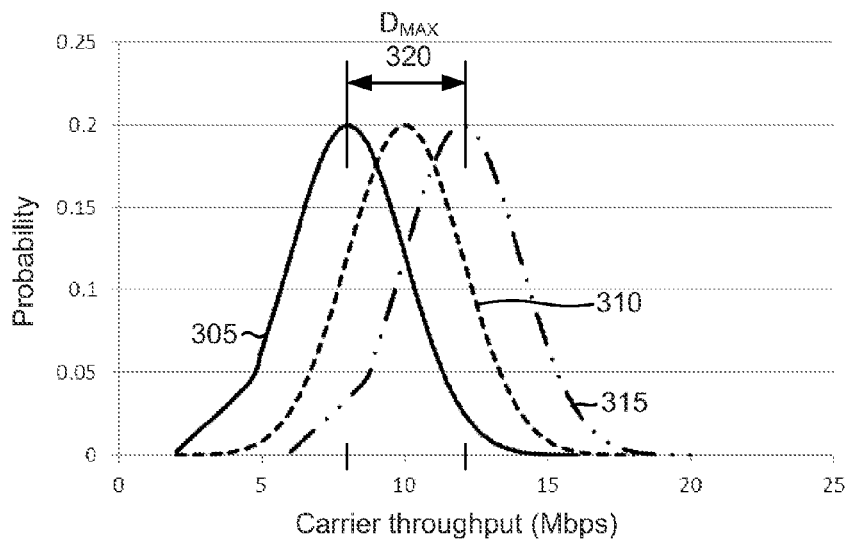
FIG. 3A illustrates exemplary distribution functions of carrier throughput.

FIG. 3A illustrates exemplary distribution functions 305, 310 and 315 of carrier throughputs of three carriers supported by an intermediate network. While three carriers are illustrated in FIG. 3A, this is merely exemplary and a greater number of carriers can be employed. The carriers can employ, for example, substantially the same frequency band, different frequency bands, and/or the same or different communication protocols. Distribution functions 305, 310 and 315 can be probability or cumulative distribution functions based on empirical data determined in an intermediate network, and can also be derived through mathematical modeling to determine statistical characteristics of carrier throughput. In FIG. 3, distribution functions 305, 310 and 315 illustrate that data traffic is not shared proportionally among the three carriers, and thus there is inefficient load balancing among the three carriers.

A load balancing efficiency metric can be determined based on the determined carrier data throughput characteristics. For example, carriers with the lowest and highest average throughput characteristics can be selected, and a difference in carrier throughput characteristics between the two selected carriers can be determined. In one embodiment, the load balancing efficiency metric can be determined by a peak-to-peak measurement between the two selected carriers can be determined, indicated in FIG. 3A as $D_{MAX}$ 320, which represents the displacement caused by the inefficient load balancing among the three carriers. Greater inefficiency among carriers supported by an intermediate network will require the deployment of larger intermediate network capacity to meet the actual maximum capacity requirements of an intermediate network. Thus, as the load balancing efficiency metric decreases, the intermediate network capacity required to meet demand on the intermediate network decreases.

Figure 3B:
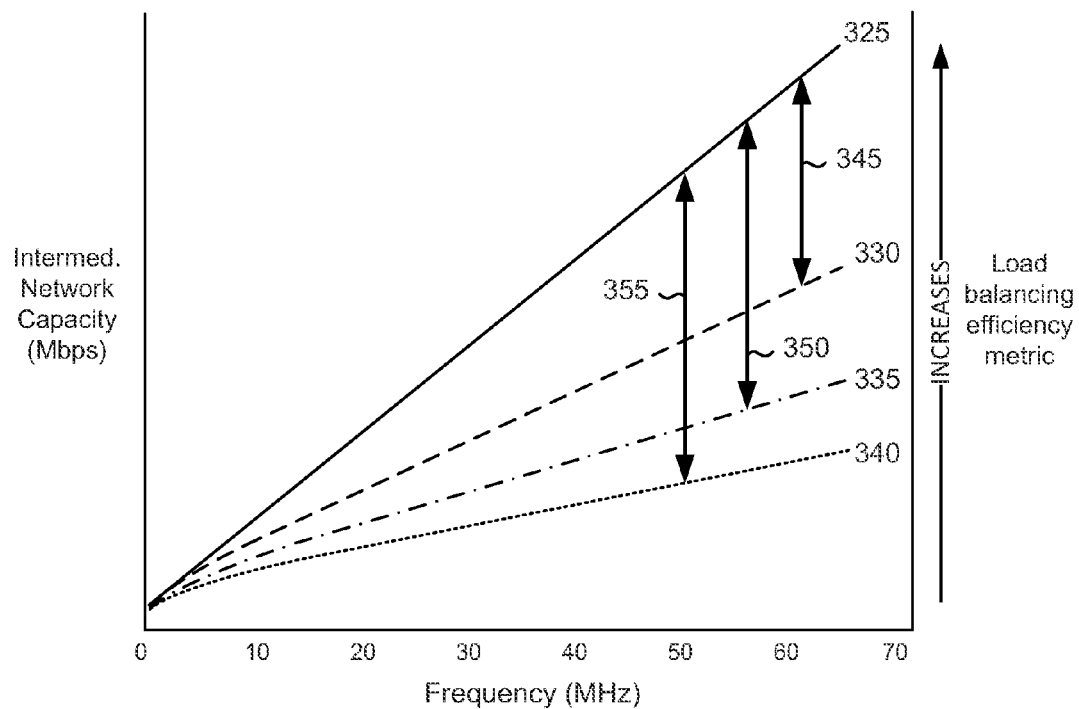
FIG. 3B illustrates exemplary relationships between theoretical maximum and actual intermediate network capacities and the carrier throughputs.

FIG. 3B illustrates exemplary relationships between theoretical maximum 325 and actual intermediate network capacity requirements 330, 335 and 340. Theoretical maximum 325 illustrates a theoretical maximum intermediate network capacity, which increases with substantial linearity with respect to the number of carriers deployed in an intermediate network. The actual intermediate bandwidth requirements of the intermediate network have a substantially logarithmic relationship to the total number of carriers in the intermediate network. The more inefficient the load balancing scheme among carriers of an intermediate network, the higher the value of the load balancing efficiency metric, whereas the greater the efficiency of load balancing among carriers of the intermediate network, the smaller the value of the load balancing efficiency metric, which correlates with a smaller actual required intermediate network capacity. Thus, the smaller the load balancing efficiency metric, the higher the multiplexing factor.

Figure 4:
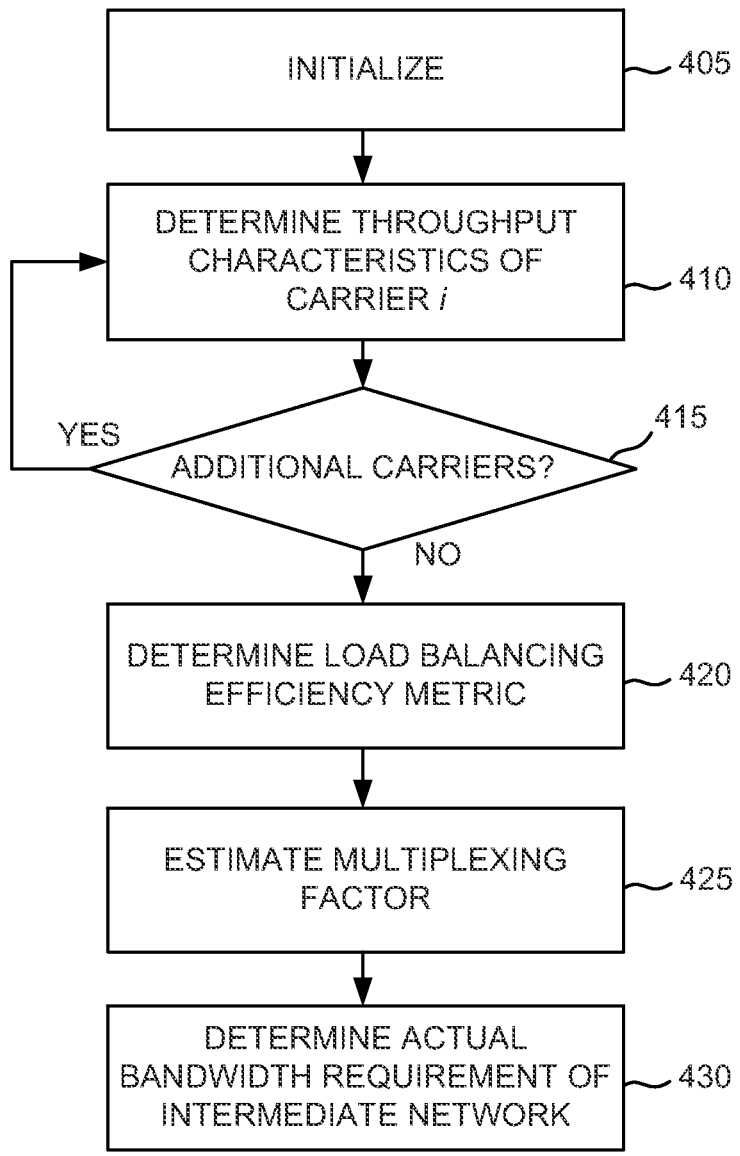
FIG. 4 illustrates an exemplary method of determining bandwidth requirements of an intermediate network.

FIG. 4 illustrates an exemplary method of determining bandwidth requirements of an intermediate network. In operation 405, one of a plurality of carriers in communication with an intermediate network is selected. For example, a selected carrier i can be selected from among n carriers. In operation 410, the data throughput characteristics of the carrier i are determined. The data throughput characteristics can be represented as a distribution function, as illustrated in FIG. 3A. In operation 415 it is determined whether any remaining carriers among the n carriers have not been selected. If any additional carriers remain (operation 415—YES), the next carrier i is selected and its throughput characteristics are determined.

When the throughput characteristics of each of the carriers have been determined, a load balancing efficiency metric is determined based on the determined carrier data throughput characteristics (operation 420). In an embodiment, the carriers with the lowest and highest throughput characteristics are selected and their throughput characteristics are compared to determine the load balancing efficiency metric.

In operation 425, a multiplexing factor based on the load balancing efficiency metric and the total number of carriers n is estimated. The multiplexing factor can be applied, for example, to inter-frequency, intra-frequency, and/or inter-technology load balancing. In operation 430, based on the multiplexing factor and a theoretical maximum bandwidth of the intermediate network, an actual bandwidth requirement of the intermediate network is determined. The actual bandwidth requirement of the intermediate network is more efficient than a theoretical maximum capacity with respect to the number of carriers deployed in consideration of the actual demand on the intermediate network.

Figure 5:
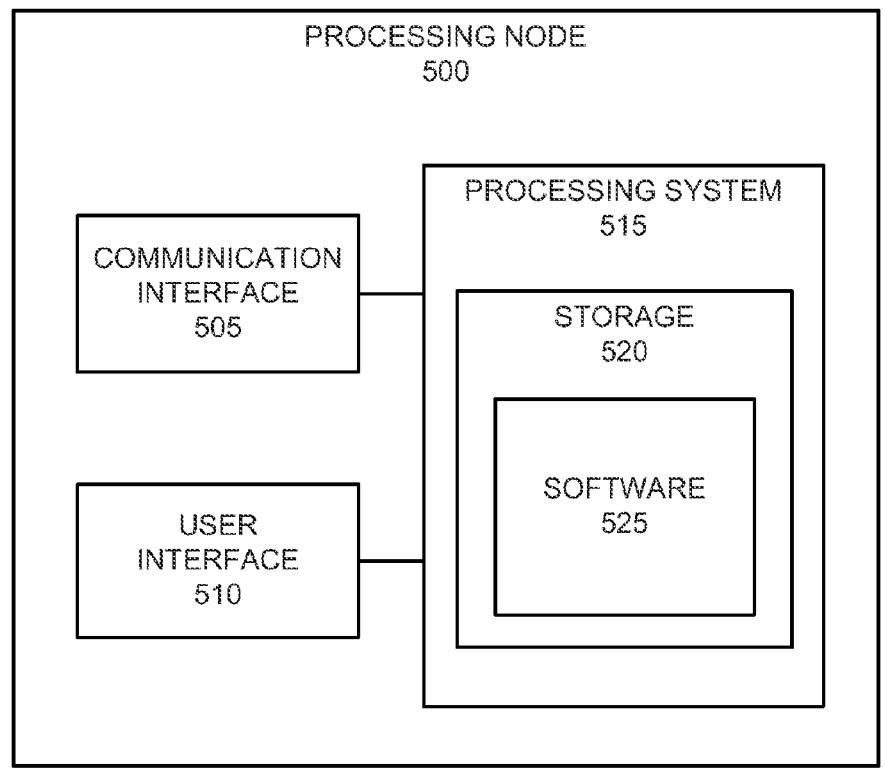
FIG. 5 illustrates an exemplary processing node.

FIG. 5 illustrates an exemplary processing node comprising a communication interface 505 and a user interface 510, each in communication with a processing system 515. Processing node 500 can be, for example, a network element in an access node, in an intermediate network, or in a subnetwork or core network of a communication system. Processing node 500 can communicate with other network elements, including wireless devices and other processing nodes, over a wired and/or wireless communication link through the communication interface 505. Processing system 515 can include storage 520, comprising a disk drive, flash drive, memory circuitry, or other memory device. Storage 520 can store software 525 which is used in the operation of the processing node 500. Software 525 may include an operating system, utilities, drivers, network interfaces, applications, or some other type of software. User interface 510 permits a user to configure and control the operation of the processing node 500.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of determining bandwidth requirements of an intermediate network, comprising:
   determining a throughput data rate for each of a plurality of carriers in communication with the intermediate network, wherein a network comprises the intermediate network, a first subnetwork comprising an edge of the network, and a second subnetwork comprising an access node and a wireless device, such that the intermediate network is located between the first subnetwork and the second subnetwork;
   determining a load balancing efficiency metric based on the determined carrier throughput data rates;
   estimating a multiplexing factor as a function of the load balancing efficiency metric and a total number of the plurality of carriers; and
   determining an actual bandwidth requirement of the intermediate network based on the multiplexing factor and a theoretical maximum bandwidth of the intermediate network comprising a sum of the theoretical maximum bandwidths of the plurality of carriers.

2. The method of claim 1, wherein determining a load balancing efficiency metric further comprises selecting carriers from among the plurality of carriers with a lowest and a highest throughput data rates and comparing the lowest and highest throughput data rates to determine the load balancing efficiency metric.

3. The method of claim 2, wherein determining a load balancing efficiency metric further comprises selecting carriers from among the plurality of carriers with a lowest and a highest throughput data rates and subtracting the lowest throughput data rates from the highest throughput data rates to determine the load balancing efficiency metric.

4. The method of claim 1, wherein the load balancing efficiency metric comprises an indication that data traffic is not distributed proportionally among the number of carriers.

5. The method of claim 1, wherein the load balancing efficiency metric is based on the efficiency of at least one of an inter-frequency load balancing scheme, an intra-frequency load balancing scheme, and an inter-technology load balancing scheme.

6. The method of claim 1, wherein the multiplexing factor increases as the load balancing efficiency metric increases.

7. The method of claim 1, wherein the actual bandwidth requirement of the intermediate network has a substantially logarithmic relationship to the total number of the plurality of carriers.

8. The method of claim 1, further comprising:
   adjusting the total number of the plurality of carriers in the intermediate network according to the actual bandwidth requirement.

9. The method of claim 1, wherein the load balancing efficiency metric increases when a load between the carriers is less efficiently balanced and the load balancing efficiency metric decreases when the load between the carriers is more efficiently balanced.

10. A processing node of a communication network, comprising:
    a communication interface, to receive data based on a plurality of carriers in communication with an intermediate network, wherein a network comprises the intermediate network, a first subnetwork comprising an edge of the network, and a second subnetwork comprising an access node and a wireless device, such that the intermediate network is located between the first subnetwork and the second subnetwork; and
    a processing system, to
        determine throughput data rates of each of a plurality of carriers in communication with the intermediate network,
        determine a load balancing efficiency metric based on the determined carrier throughput data rates,
        estimate a multiplexing factor as a function of the load balancing efficiency metric and a total number of the plurality of carriers, and
        determine an actual bandwidth requirement of the intermediate network based on the multiplexing factor and a theoretical maximum bandwidth of the intermediate network comprising a sum of the theoretical maximum bandwidths of the plurality of carriers.

11. The processing node of claim 10, wherein to determine the load balancing efficiency metric the processing system further selects carriers from among the plurality of carriers with a lowest and a highest throughput data rates and compares the lowest and highest throughput data rates to determine the load balancing efficiency metric.

12. The processing node of claim 11, wherein to determine the load balancing efficiency metric the processing system further selects carriers from among the plurality of carriers with a lowest and a highest throughput data rates and subtracts the lowest throughput data rates from the highest throughput data rates to determine the load balancing efficiency metric.

13. The processing node of claim 10, wherein the load balancing efficiency metric comprises an indication that data traffic is not distributed proportionally among the number of carriers.

14. The processing node of claim 10, wherein the load balancing efficiency metric is based on the efficiency of at least one of an inter-frequency load balancing scheme, an intra-frequency load balancing scheme, and an inter-technology load balancing scheme.

15. The processing node of claim 10, wherein the multiplexing factor increases as the load balancing efficiency metric increases.

16. The processing node of claim 10, wherein the actual bandwidth requirement of the intermediate network has a substantially logarithmic relationship to the total number of the plurality of carriers.

17. The processing node of claim 10, wherein the load balancing efficiency metric increases when a load between the carriers is less efficiently balanced and the load balancing efficiency metric decreases when the load between the carriers is more efficiently balanced.

* * * * *